United States Patent Office 3,492,276
Patented Jan. 27, 1970

3,492,276
SULFUR-CONTAINING COPOLYMERS OF CHLOROPRENE, A CARBOXYL-CONTAINING MONOMER, AND ANOTHER MONOMER
John Frederick Smith, Wilmington, Del., assignor to E. I. du Pont de Nemours and Company, Wilmington, Del., a corporation of Delaware
No Drawing. Continuation-in-part of application Ser. No. 611,572, Jan. 25, 1967. This application Dec. 18, 1967, Ser. No. 691,172
Int. Cl. C08d 3/02, 3/14
U.S. Cl. 260—79
6 Claims

ABSTRACT OF THE DISCLOSURE

Polymers of chloroprene (2-chlorobutadiene-1,3) containing (1) 0.25 to 0.6 weight percent carboxyl groups present in monomer units of $CH_2=CR-COOH$ (e.g., methacrylic or acrylic acids), (2) 3 to 30 mole percent of units of another monomer (e.g., 2,3-dichlorobutandiene or acrylonitrile) polymerized in the presence of 0.4 to 1.5 weight percent sulfur. The polymers confer good freeze and creep resistance and acceptable viscosities in pressure-sensitive adhesives made therefrom.

CROSS-REFERENCE TO RELATED APPLICATION

This application is a continuation-in-part of my application Ser. No. 611,572, filed Jan. 25, 1967.

BACKGROUND OF THE INVENTION

Field of the invention

This invention relates to chloroprene copolymers and, more particularly, to carboxyl-containing chloroprene-sulfur copolymers suitable for use in adhesives.

Description of prior art

Chloroprene-sulfur copolymers and carboxyl-containing copolymers are known in the art. See Whitby, "Synthetic Rubber," 1954, page 770, as well as U.S. Patents 1,950,439, 2,234,215 and 2,356,091. Further, assigned's U.S. Patent 3,308,087 to Garrett, issued Mar. 7, 1967, describes chloroprene polymers containing 0.02 to 0.7 weight percent carboxyl groups and states that sulfur may be present to incorporate polysulfide linkages into the polymer, and that other monomer units, e.g., 2,3-dichloro-1,3-butadiene, can be introduced into the polymer.

The prior art does not, however, suggest how a carboxyl-containing chloroprene-sulfur copolymer can be prepared that will yield the combination of properties so necessary to a pressure-sensitive adhesive, such as good freeze and creep resistance as well as acceptable viscosities. In general, the prior art compounds that do have one or more of these properties lack one or more of the others. All are necessary to obtain high-quality products.

SUMMARY OF THE INVENTION

A carboxyl-containing chloroprene-sulfur copolymer containing (1) carboxyl-containing monomer units in an amount to create about 0.25 to 0.6 (preferably 0.26 to 0.36) weight percent carboxyl groups, and (2) about 3 to 30 (preferably 3.5 to 10) mole percent of units of another ethylenically unsaturated monomer copolymerizable with chloroprene polymerized in the presence of about 0.4 to 1.5 weight percent sulfur.

DESCRIPTION OF PREFERRED EMBODIMENTS

The chloroprene polymer of this invention must have been polymerized in the presence of at least about 0.4 weight percent sulfur, based on the total weight of organic monomer plus sulfur. While amounts up to about 1.5 percent are satisfactory, as a practical matter amounts up to about 0.6 weight percent are preferred.

It is also essential that the chloroprene polymer contain units of carboxyl-containing monomer. Representative monomers have the formula

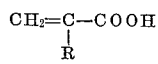

where R is hydrogen or $C_1$ to $C_4$ alkyl. Preferred is methacrylic acid. Acrylic acid is quite satisfactory but greater amounts must be present in the polymerization to incorporate sufficient monomer units into the polymer. When methacrylic acid is the carboxyl-containing monomer, the ranges of weight percentages of carboxyl groups of 0.25 to 0.6 (preferably 0.26 to 0.36) can be expressed as 0.4 to 1 (preferably 0.5 to 0.7) weight percent methacrylic acid units in the polymer. When the upper ranges of carboxyl group content are employed, the upper ranges of sulfur content should also be employed to help reduce undesirably high viscosity.

It is essential that the copolymer additionally contain units of another (i.e., not a carboxyl-containing) ethylenically unsaturated comonomer copolymerizable with chloroprene. Particularly preferred are 2,3-dichloro-1,3-butadiene and acrylonitrile. Representative of others are methyl methacrylate, styrene, vinyl chloride, and vinylidene chloride. If less than 4 mole percent of such monomer units are present, the polymer may be objectionably crystalline and adhesives made therefrom lose tack. Preferably, these monomer units are present in less than about 10 mole percent to afford exceptional adhesive properties. It is to be understood that these comonomer units may be derived from one or a mixture of more than one comonomer.

The copolymer latices to which the present process is applicable may be prepared by essentially standard procedures for emulsion polymerization. The following general procedure has been found effective for preparing latices from which carboxylated copolymer may be isolated. This procedure is especially preferred for preparing aqueous dispersions of copolymers of chloroprene and methacrylic acid.

A solution of chloroprene, sulfur, a monomer of the formula

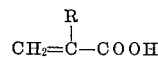

where R is hydrogen or $C_1$ to $C_4$ alkyl (the solution containing less than 5% by weight of carboxyl groups based on the weight of the solution), and other comonomer is emulsified in water by using surfactants such as organic sulfonates or sulfates. The concentration of carboxyl-bearing monomer determines the approximate concentration of acid groups in the final copolymer. A modifying agent or chain transfer agent should be included in the emulsion to control the molecular weight and viscosity of the copolymer. As known by those skilled in the art, increasing amounts of a given modifier lower molecular weight and viscosity. Examples of suitable modifying agents are aliphatic mercaptans having 4 to 18 carbon atoms and dialkyl xanthogen disulfides in which the alkyl groups have 1 to 8 carbon atoms. Polymerization is brought about by the addition of a redox catalyst, examples of which are potassium persulfate in combination with sodium sulfite, hydrogen peroxide with sodium hydrosulfite, and potassium ferricyanide with sodium sulfite. The catalyst components should be added in such a way as to give a controllable polymerization. The polymerization usually is conducted at temperatures which may range from 30° C. to 60° C. Conversions of at least 70%, and preferably around 90%, are preferred. Well-known techniques may be used for incorporating the less reactive monomer, as, for example, the method of U.S. Patent 2,100,900. The progress of the polymerization may be followed by changes in the specific gravity of the reaction mass. When the desired conversion has been reached, polymerization may be stopped by the addition of substances such as phenothiazine, p-tert-butyl-pyrocatechol and di-tert-butylhydroquinone.

The aqueous dispersion of the copolymer produced by the procedures given above is acidic and exhibits pH values of about 2 to 3 depending on the specific ingredients and the amounts employed in the polymerization. It should be adjusted to above pH 7.5 before stripping out unreacted monomers. Any alkali metal hydroxide, organic amine, or ammonia may be employed in the form of its aqueous solution for pH adjustment. This includes hydroxides of the elements in Group I-A of the periodic table. For reasons of economy, sodium and potassium hydroxides are preferred, with sodium hydroxide being especially preferred.

When sodium hydroxide is used for pH adjustment, the concentration of the solution employed is important. Reference is made to Smith, U.S. Patent 3,347,837. The maximum concentration which does not lead to coagulation as the hydroxide solution is introduced into the copolymer dispersion is preferred since reduction of the copolymer concentration in the dispersion is undesirable. Sodium hydroxide concentrations greater than about 2% tend to form coagulum at the point of introduction to the dispersion unless additional soap is added to the caustic solution to improve the colloidal stability at the point of mixing. Concentrations below 2% may be used, but, as previously indicated, this results in needless dilution of the latex.

After completion of the pH adjustment, unreacted monomers may be removed by distillation or preferably by steam-stripping as disclosed in U.S. 2,467,769. The polymer contained in the stripped dispersion may then be isolated by coagulation effected by freezing as disclosed in U.S. 2,187,146. Alternatively, the copolymer may be isolated by drum drying the dispersion. The pH should be readjusted to about 6 after stripping and before isolation to convert the carboxyl groups in the polymer to free acid rather than carboxylate ion.

Copolymers isolated by the improved process of the present invention may be used in many applications in place of conventional chloroprene polymers.

The copolymers of this invention are particularly useful in the preparation of pressure-sensitive adhesive mastics; they can be made and used as generally described in Little, U.S. Patent 2,382,731 and other publications known to those skilled in the art. Up to about 200 parts of tackifying agents (e.g., glyceryl esters of wood rosin, oil-soluble thermoplastic terpene phenolic resins such as "SP-553" from Schenectady Chemical, Inc., and those mentioned in the Little patent) can be employed.

Contact adhesives using the copolymer of this invention can be used and prepared as described in Garrett, French Patent 1,437,431, or his U.S. Patent 3,308,087. Up to 200 parts of substituted phenol-formaldehyde low-melt resole resins can be employed therein.

The copolymers can also be used in adhesive sealants with the above-named tackifiers and fillers such as clay, carbon black or $CaCO_3$ with softening agents such as ester plasticizers or oils.

All of the above employ metal oxides and solvents as well as the ingredients mentioned. For the copolymer of this invention, a solvent system of a volatile aromatic solvent (e.g., toluene, benzene or xylene) and a ketone or ester (e.g., methyl ethyl ketone or ethyl acetate) is particularly helpful.

The invention will now be described with reference to the following specific examples thereof wherein parts and percentages are by weight unless otherwise indicated and "phr." stands for parts per 100 parts of copolymer.

EXAMPLES 1, 2 AND 3

Mixtures of monomers are prepared as listed in Table I. 7.8 grams diisopropylxanthogen disulfide chain transfer agent, and 36 g. Nancy wood rosin are added to each mixture. The mixtures are then emulsified separately by agitation in an Eppenbach Homomixer with a soap solution containing 12 g. of the triethanolamine salt of dodecylbenzene sulfonic acid and 6 g. of the sodium salt of a condensed mononaphthalene sulfonic acid ("Lomar PW," Jacques Wolf and Co.).

TABLE I

| Monomer mixtures | Example | | |
|---|---|---|---|
| | 1 | 2 | 3 |
| Chloroprene | 924 | 874 | 914 |
| 2,3-dichlorobutadiene | 50 | 100 | 50 |
| Methacrylic acid | 20 | 20 | 30 |
| Sulfur | 6 | 6 | 6 |

Each emulsion is brought to 40° C. and treated with 1 g. cumene hydroperoxide. Twenty-five cc. of a one percent solution of sodium hydrosulfite is added portion-wise at such a rate that the temperature of the emulsion is maintained at 40° C. by the heat of polymerization while external cooling is applied. A five percent solution of sodium hydrosulfite is then added drop-wise until no further polymerization takes place. From 10 to 30 cc. of a five percent sodium hydrosulfite are required. The specific gravity of the emulsion at this point is about 1.080 to 1.089, representing approximately 90 percent conversion of monomer to polymer.

Fifteen grams of an emulsion of a solution of 0.15 g. phenothiazine, 0.15 g. p-t-butylpyrocatechol in 26.0 g. toluene with 0.43 g. sodium dodecylsulfate, 0.15 g. "Lomar PW" in 4.5 g. water is added to each emulsion and its pH is adjusted to 7.5 by addition of a 2 percent solution of sodium hydroxide water. The latexes are treated with steam under vacuum to remove unreacted volatile monomers and the pH's are adjusted to 6.0 by addition of a one percent solution of "Lomar PW" in 10 percent acetic acid. Polymers are isolated from the latex by freezing. They are washed with water and dried in an air-circulating oven at 100° C.

Table II lists the composition in terms of percent of units present in the polymers with their Mooney viscosities (minimum reading after 2½ minutes on a Mooney viscometer using a large rotor at 100° C.) determined after passing the raw polymer ten times through the nip of a 6″ x 12″ rubber mill heated to 50° C. The freeze resistance of the polymers is estimated by molding 1 x ½-inch cylindrical pellets and measuring the increase in hardness when the pellets are held at 0° C. The number of days elapsing before a hardness of 50 Shore A is reached is given in Table II.

The polymers are converted into cements (Cement A) by dissolving 35 g. of each in 105 g. of solution of 23.3 g. tetraethylthiuram disulfide and 4.66 g. of piperidinium pentamethylene dithiocarbamate in a mixture of 3500 cc. of toluene, 1725 cc. hexane and 1725 cc. methyl ethyl ketone. The Brookfield viscosity of these cements is given in Table II. The cements are then converted into pressure-sensitive adhesives (Cement B) by the addition of 50 g. of a solution of 234 g. of the glyceryl ester of wood rosin ("Stabelite Ester No. 10," Hercules, Inc.), 52 g. of a naphthenic petroleum oil ("Circosol 42XH," Sun Oil Co.), 19.5 g. of a dispersion of zinc oxide in fluid styrene/butadiene rubber (60% active ingredient), 26 g. of a similar suspension of magnesium oxide (40% active ingredient), 8.8 g. isopropanol, and 1.8 g. water in 130 g. of the solvent mixture defined above. The Brookfield viscosities of these pressure-sensitive adhesive cements are also given in Table II.

One inch wide strips of mastic are deposited from these cements on 1.5 mil "Mylar" film with a 10 mil draw cup, allowed to air dry, then heated 10 minutes in an oven maintained at 120° C. The creep resistance of the adhesives are compared in the manner specified by the Pressure Sensitive Tape Council (Glenview, Illinois) using a 2 kg. weight suspended from 0.5 square inch area of adhesion. The time taken for each mastic to fail and allow the weight to fall is given in Table II.

TABLE II

| | Example | | |
|---|---|---|---|
| | 1 | 2 | 3 |
| Methacrylic acid (percent) | 0.6 | 0.6 | 0.9 |
| Carboxyl content (percent) | 0.31 | 0.31 | 0.47 |
| 2,3-dichlorobutadiene-1,3: | | | |
| Weight percent | 5.5 | 11.1 | 5.5 |
| Mole percent | 4 | 8 | 4 |
| Sulfur (in original monomer mixture, percent) | 0.6 | 0.6 | 0.6 |
| Mooney viscosity | 36 | 51 | 30 |
| Brookfield viscosity (centipoises) (Cement A) | 232 | 334 | 213 |
| Brookfield viscosity (centipoises) (Cement B) | 224 | 312 | 346 |
| Creep resistance (min. to failure) | 130 | 300 | 90 |
| Days at 0° C. to develop 50 Shore A hardness | 17 | >50 | 27 |

To illustrate the criticality of the ranges of the invention, experiments can be made outside the limits thereof. For example, if Example 1 is repeated except that only 0.2% sulfur is employed, the Brookfield values will be unacceptably high and the creep resistance drops severely; if no sulfur at all is used, the Brookfield values are as high as thirty times greater. If in Example 1 0.2% sulfur is used and the methacrylic acid is 0.15, the Brookfield viscosities are objectionably high and the creep resistance is unacceptably poor. If in Example 1 only the dichlorobutadiene percent is lowered to 1.1%, the freeze resistance is so poor that a 50 Shore A hardness may develop in only 4 days at 0° C. Lowering only the methacrylic acid levels in Example 1 to 0.3% and 0.15% causes the creep resistance values to drop to very low levels (e.g., 4 to 2 min.) and the freeze resistance to drop to about 10 or 11 days.

However, one can produce acceptable polymers according to this invention by employing various other carboxyl-containing monomers instead of the methacrylic acid. If acrylic acid is to be used, greater amounts should be used in the polymerization mixture to obtain the same amount of carboxyl groups on the polymer. The other $CH_2=CR-COOH$ monomers are more nearly like methacrylic acid in their reactivity.

Other ethylenically unsaturated monomers than 2,3-dichlorobutadiene-1,3, or a mixture of monomers, can be used in the above examples. Acrylonitrile is quite suitable in equivalent molar amounts in the polymer; about five times as much acrylonitrile in the polymerization mixture may be required because of its lower reactivity. Methyl methacrylate, styrene, vinyl chloride and vinylidene chloride may require increasingly strong polymerization conditions to incorporate their units into the polymer. Such reactivity characteristics and methods to handle them are known to those skilled in the art.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What I claim is:

1. A carboxyl-containing chloroprene-sulfur copolymer containing (1) carboxyl-containing monomer units in an amount to create about 0.25 to 0.6 weight percent carboxyl groups, and (2) about 3 to 30 mole percent of units of another ethylenically unsaturated monomer copolymerizable with chloroprene, polymerized in the presence of about 0.4 to 1.5 weight percent sulfur.

2. A copolymer as defined in claim 1 wherein said sulfur weight range is 0.4 to 0.6 percent.

3. A copolymer as defined in claim 1 wherein said carboxyl-containing monomer has the formula

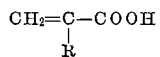

where R is hydrogen or $C_1$ to $C_4$ alkyl and said monomer is present in amounts to create about 0.26 to 0.36 weight percent carboxyl groups, said sulfur weight range is 0.4 to 0.6 percent and said mole percent range of ethylenically unsaturated monomer is about 3.5 to 10 mole percent.

4. A copolymer as defined in claim 3 wherein said carboxyl-containing monomer is methacrylic acid or acrylic acid.

5. A copolymer as defined in claim 3 wherein said ethylenically unsaturated monomer copolymerizable with chloroprene is 2,3-dichloro-1,3-butadiene or acrylonitrile and said carboxyl-containing monomer is methacrylic acid or acrylic acid.

6. A pressure-sensitive adhesive containing the copolymers of claim 3.

References Cited

UNITED STATES PATENTS

| 3,308,087 | 3/1967 | Garrett | 260—31.2 |
| 3,347,837 | 10/1967 | Smith | 260—87.5 |

OTHER REFERENCES

Hofmann, W.: Vulcanization, Palmerton (New York), 1965, p. 76.

JOSEPH L. SCHOFER, Primary Examiner

C. A. HENDERSON, Jr., Assistant Examiner

U.S. Cl. X.R.

117—122, 161; 260—27, 30.8, 32.8, 33.6, 41.5, 79.1, 79.3, 79.5, 80.7, 775, 847, 890